Oct. 5, 1943.  A. RICKENMANN  2,330,921
MACHINE TO PRODUCE SPIRAL GROOVES
Filed April 18, 1942
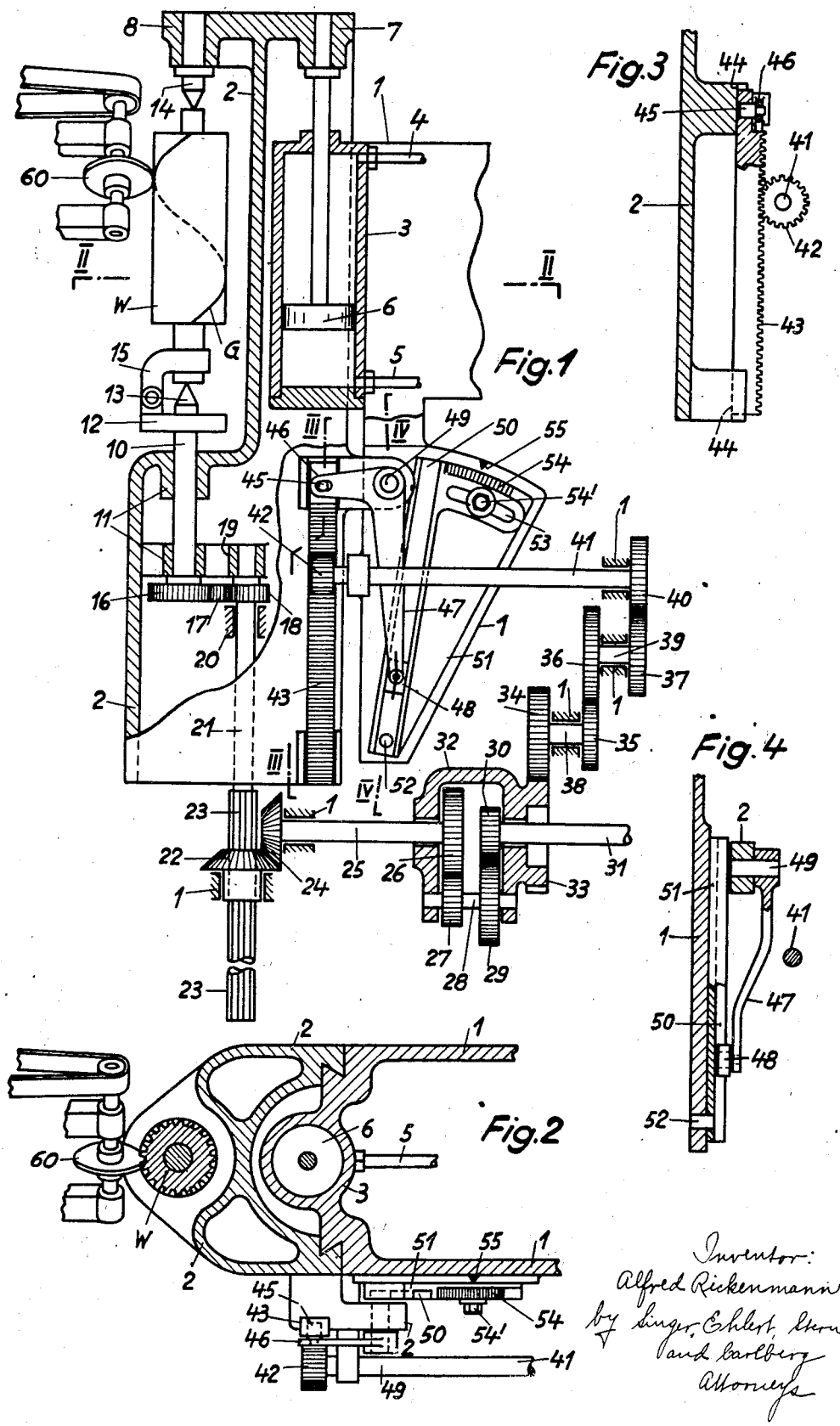
Inventor:
Alfred Rickenmann
by Singer, Ehlert, Iron
and Carlberg
Attorneys Patented Oct. 5, 1943

2,330,921

UNITED STATES PATENT OFFICE 2,330,921

MACHINE TO PRODUCE SPIRAL GROOVES

Alfred Rickenmann, Zurich, Switzerland; vested in the Alien Property Custodian

Application April 18, 1942, Serial No. 439,511
In Switzerland December 13, 1940

9 Claims. (Cl. 90—20)

The invention relates to a new and improved machine to produce spiral grooves or teeth in cylindrical blanks for instance spiral gears.

The invention relates more particularly to machines of the said type which may be used to produce grooves or teeth with any helix angle and lead on blanks of any diameter.

The main object of the invention is the provision of means to get a very high precision in shaping the grooves or teeth to the correct helix angle and lead by very simple means.

In the drawing

Fig. 1 is a side elevation of part of a machine shown in a diagrammatical manner.

Fig. 2 is a section taken on line II—II of Fig. 1.

Figs. 3 and 4 are sections on the lines III—III and IV—IV of Figs. 1 and 2.

On a base 1 a carriage 2 is slidably mounted on horizontal ways. In the base 1 there is arranged a cylinder 3 communicating with pipes 4 and 5 with a pressure fluid mechanism of known construction and not shown in the drawing. The piston 6 of the cylinder 3 is fastened to a bracket 7 of the carriage 2 the latter being reciprocated by the piston 6. On the carriage 2 the work-piece W is fastened to an arbor which is held between the points 13, 14. The point 14 is arranged on a support 8 and the point 13 is attached to a shaft 10. The shaft 10 is journalled in bearings 11 of the carriage 2. A clamping device 12, 15 connects the work-piece W with said shaft 10, for rotation with the shaft 10. A spur wheel 16 fixed to shaft 10 drives by means of an intermediate gear 17 a spur wheel 18. The gear 18 is fixedly arranged on a shaft 21 which is supported in bearings 19, 20. Splines 23 on shaft 21 engage corresponding grooves in the bore of the bevel gear 22. The rotation of the latter is transmitted to said shaft 21 and through the gears 18, 17, 16 to the work-piece W at any position of the carriage 2 on the base 1. The bevel gear 22 is driven by a bevel gear 24 on shaft 25 journalled in the base 1. A spur gear 26 fixed to shaft 25 is in engagement with gear 27 on an intermediate shaft 28 on which a gear 29 meshes with gear 30 on a shaft 31 arranged co-axially with shaft 25. The intermediate shaft 28 is journalled in a frame 32 rotatably mounted on the two shafts 25 and 31. An annular spur gear 33 fastened to the rotary frame 32 engages gear 34 of a set of gears 34, 35 on shaft 38. The gearing, furthermore, includes gears 36, 37 on shaft 39, and gear 40 keyed on shaft 41. The latter is journalled in the base 1 and carries a spur wheel 42 meshing with a rack 43, arranged on the carriage 2. Upon reciprocation of the carriage 2 and the rack 43, the entire train of gears 42 to 16, spindle 10 and the clamping device 12, 15 and the work-piece W are imparted rotation. The rack 43 is slidably arranged in ways 44, running parallel to the direction of travel of the carriage 2. A stud 45 fixed to an arm 46 of an angular lever 47 enters an elongated slot of rack 43, the other arm of the lever 47 carrying pivotally a block 48. The bell crank lever 47 turns on a pivot 49 fixed to carriage 2 and the block 48 slidingly engages a straight groove 50 of a correcting member 51. The latter pivots about a stud 52 in a lateral extension of the base 1, the member 57 is provided with a circular slot 53, and may be held in selected angular position by a clamping screw 54' passing through the slot 53. The angular position of the groove 50 with reference to the path of carriage 2 may be adjusted and read off on a scale 54 and an index 55. When the carriage 2 reciprocates, the rack 43 connected with the carriage through the elements 45, 46, 49 also reciprocates but an additional feed is given to the rack 43 due to the rocking movement of lever 46 induced by the movement of block 48 in groove 50 of the said correcting member 51. To cut the grooves on the work-piece W a rotary tool 60 is arranged, for instance a milling cutter, a grinding disk and so on, which is positively driven by a motor not shown in the drawing. The shaft of the tool 60 preferably is set at an angle with reference to the axis of the work-piece W corresponding to the lead or pitch of the spiral groove G to be cut. The lead of the groove G may be varied by choosing appropriate change speed gears 16 to 41. Right handed grooves or left handed grooves may be produced by changing the direction of rotation of the work-piece W by inserting or removing a transmitting spur wheel in the train of the said gears as known per se.

To produce a groove G of a certain lead or with a certain helix angle, a set of predetermined change speed gears 16 to 41 is to be used. It frequently happens that change speed gears of the correct diameters are not available to get exactly the desired lead. The new machine allows to compensate any inaccuracy. The angular position of the groove 50 is selected according to requirement to impart the proper rotation to the work-piece at a given and constant stroke of the carriage 2.

The change speed gears necessary to produce a number of different leads may be tabulated and the angles of said groove 50 necessary for correction within two following leads may also be tabulated and the true position of the correcting member 51 may be found by the aid of the scale 54. The position of groove 50 may be chosen that the rack 43 is moved in the one or in the other direction to increase or decrease the ratio as desired.

To get a helix lead of true size, the following conditions are to be maintained

If Ws=stroke of carriage 2
   Wz=effective way of rack 43
   X=lead of the helix to be obtained
   Sw=lead of the helix next to the desired one and possible to be obtained with the change speed gears at hand then:
$$Ws:Wz = X:Sw$$

gives the values to get a lead of true size. The difference of the values Ws and Wz may be given in per cents of the desired lead. The scale 54 would have to bear the proper markings. The change speed gears may be arranged at any other position in the gearing.

Having thus described my invention, what I claim as new and desire to secure by Letters Patent is:

1. In a machine of the character described, the combination of a table, means for reciprocating it, a rotary work support on the table, selectively variable means for rotating the work support and means controlled by the table for altering the speed at which said selectively variable rotating means become effective upon the work support.

2. In a machine of the character described, the combination of a table, means for reciprocating it, a rotary work support on the table, selectively variable means for rotating it, an element movable relatively to the table and supported thereby, and means controlled by the element for altering the speed at which the said selectively variable means become effective upon the work support.

3. In a machine of the character described, the combination of a table, means for reciprocating it, a rotary work support, selectively variable means for rotating the work support on the table, an element movable relatively to the table and reciprocable with the same, means for imparting movement to said element relatively to the table while the table is reciprocating, and means controlled by said element while in motion relatively to the table for altering the speed at which said selectively variable rotating means become effective on the work support.

4. In a machine of the character described, the combination of a table, means for reciprocating it, a rotary work support, selectively variable means for rotating the work support on the table, an element movable relatively to the table and reciprocable with the same, selectively adjustable means for imparting movement to said element relatively to the table while the table is reciprocating, said element actuating the selectively variable means for rotating the work support, whereby in accordance with the movement of said element relatively to the table, the speed of said selectively variable means is altered.

5. In a machine of the character described, the combination of a table, means for reciprocating it, a rotary work support, selectively variable means for rotating the work support on the table, a rack bar supported by the table and in engagement with the selectively variable means for rotating the work support, and means for shifting said rack bar relatively to the table to a selectively determined degree while the table is in motion.

6. In a machine of the character described, the combination of a table, means for imparting reciprocating movement of uniform stroke to said table, a rotary work support on the table, selectively variable means for rotating the work support on the table, a rack bar carried by the table and selectively adjustable means for moving said rack bar relatively to the table while the latter is in motion for altering the speed of the work support rotating means from that speed which said selectively variable means would have when engaged by the rack bar fixed to the table.

7. In a machine of the character described, the combination of a table, a pressure fluid mechanism for reciprocating said table with a uniform stroke, a rotary work support on the table, selectively variable means for rotating the work support on the table, a rack bar carried by the table and in engagement with said selectively variable means and adapted to operate said selectively variable means upon reciprocation of said table, a lever carried by said table and connected with said rack bar, and means for rocking said lever during movement of said table to impart a relative movement to said rack bar with respect to said table.

8. In a machine of the character described, the combination of a stationary base, a table, means for uniformly reciprocating said table on said stationary base, a rotary work support on the reciprocating table, selectively variable means for rotating the work support on the table, a rack bar slidably carried on the table, a bell crank lever pivoted to said table and engaging said rack bar and an element on the stationary base for rocking said lever during movement of said table, whereby a relative movement is imparted to said rack bar with respect to said table.

9. In a machine of the character described, the combination of a stationary base, a table, pressure fluid mechanism for reciprocating the table at uniform stroke, a rotary work support carried by the table, a selectively variable set of change speed gears driving said work support, a rack bar mounted on the table for sliding movement, a bell crank lever pivoted to said table and in engagement with said rack bar, an angularly adjustable corrector element carried by the base and provided with a groove engaged by said lever to determine the rocking movement of said lever during the reciprocating movement of the table with respect to the base, said rack bar being in driving engagement with the selectively variable set of change speed gears.

ALFRED RICKENMANN.